(12) United States Patent
Budagher

(10) Patent No.: US 7,484,698 B2
(45) Date of Patent: Feb. 3, 2009

(54) STACKABLE TRANSMISSION LINE HANGER

(76) Inventor: Michael Budagher, 5964 Azalia, Dallas, TX (US) 75230

( * ) Notice: Subject to any disclaimer, the term of this patent is extended or adjusted under 35 U.S.C. 154(b) by 0 days.

(21) Appl. No.: 11/789,359

(22) Filed: Apr. 23, 2007

(65) Prior Publication Data

US 2007/0246616 A1    Oct. 25, 2007

Related U.S. Application Data

(60) Provisional application No. 60/793,839, filed on Apr. 21, 2006.

(51) Int. Cl.
*F16L 3/22* (2006.01)
(52) U.S. Cl. ................... 248/68.1; 174/40 R
(58) Field of Classification Search ........... 248/68.1, 248/74.1, 73, 49, 67.7, 65, 62; 174/40 R
See application file for complete search history.

(56) References Cited

U.S. PATENT DOCUMENTS

| | | | | |
|---|---|---|---|---|
| 5,794,897 A * | 8/1998 | Jobin et al. | ........... | 248/74.4 |
| 6,079,673 A * | 6/2000 | Cox | ........... | 248/63 |
| 6,354,543 B1 * | 3/2002 | Paske | ........... | 248/68.1 |
| 6,899,305 B2 * | 5/2005 | Korczak et al. | ........... | 248/68.1 |
| 7,007,900 B2 * | 3/2006 | Goodwin et al. | ........... | 248/68.1 |
| 7,097,142 B1 * | 8/2006 | Schmidt | ........... | 248/68.1 |
| 7,175,138 B2 * | 2/2007 | Low et al. | ........... | 248/68.1 |
| 7,293,745 B2 * | 11/2007 | Catapano | ........... | 248/61 |
| 2006/0249634 A1 * | 11/2006 | Van Walraven | ........... | 248/71 |

* cited by examiner

*Primary Examiner*—Ramon O Ramirez

(57) ABSTRACT

The invention comprises a stackable transmission line hanger for attaching multiple lines, coaxial cables, electrical cables, waveguides, pipes or lengths of similar products to a supporting structure. The invention further comprises multiple supporting elements easily attachable to, and detachable from, each other. The clamping elements can grip or clamp multiple transmission lines at once, and comprise mating posts and receptors to facilitate their respective alignment when in use. After alignment, the clamping elements can be pressure-engaged together to form a gripping or clamping structure. The gripping effect allows the line hanger to be moved along the transmission line(s) until it is placed in the desired location and before it is firmly secured. The line hanger also comprises a securing/stacking aperture that extends through it and parallel to the mating posts and receptors, and methods to assemble, disassemble and stack so multiple lines or various shapes and sizes can be supported.

10 Claims, 5 Drawing Sheets

STACKABLE TRANSMISSION LINE HANGER

CROSS-REFERENCE TO RELATED APPLICATION

I hereby claim the benefit under Title 35, United States Code Section 119(e) of any United States Provisional Application(s) listed below:
Application No. 60/793,839
Filing Date: Apr. 21, 2006

BACKGROUND OF THE INVENTION

1. Technical Field of the Invention

This invention relates generally to transmission lines, electrical conduits and electrical cables. This invention relates particularly to multidirectional, stackable hangers for supporting one or more transmission lines, electrical conduits and electrical cable housings next to each other.

2. Description of the Background Art

Hangers are the preferred devices used for supporting transmission lines, electrical conduits and electrical cable housings. Transmission line hangers receive the lines, conduits or housings and secure them to a supporting structure. Hangers are mostly used to support coaxial cables carrying a great variety of electrical signals. In most uses, the cables must be secured to supporting structures along most, if not all, of their length.

The construction and telecommunications industries use a wide variety of lines, conduits and cables which must be secured when in transit from one location to another, i.e., running an electrical conduit from one light to the next one. Multiple steps are required to use the prior art hardware commonly used to secure cables or conduits to supporting structures.

U.S. Pat. No. 6,354,543 (the "'543 patent") discloses and claims a hanger structure commonly known as "snap and stack." The structure disclosed in the '543 patent can secure single lines of cable and then attach additional lines to the first, then to the second and so on. Each time a new line is secured, a new and separate "attaching" step must take place.

U.S. Pat. No. 5,794,897 (the "'897 patent") discloses and claims a hanger device that allows two lines to be secured at the same time. The device of the '897 patent would theoretically also allow additional sets of two lines to be attached to the original two lines secured to the supporting structure.

An object of the present invention is to provide for an electrical conduit hanger structure which is easy to assemble, and which reduces the number of steps necessary to secure electrical conduits to a supporting structure.

Another object of this invention is to allow the easy stacking, and easy destacking, of multiple cables, which can then be also easily secured to a supporting structure.

A further object of this invention is to obviate the use of additional hardware to attach the device of this invention to a transmission line tower or to stack the cables or conduits together.

The invention disclosed and claimed herein incorporates into a single structure the most salient features of the devices of the prior art. The device of the present invention secures cables or lines two at a time and includes a "quick connect" feature which allows additional cables to be piggy-backed to the original securing hanger. The present invention allows multiple "piggy-backings" to take place, as needed. In addition, the present invention can be manufactured to accommodate conduits of different shapes and thicknesses, so it can be used to piggyback cables of variable sizes.

SUMMARY OF THE INVENTION

The device of this invention comprises a stackable transmission line hanger for attaching multiple transmission lines, coaxial cables, electrical cables, waveguides, pipes or lengths of similar products to a supporting structure. The subject invention further comprises multiple clamping elements easily attachable to each other and easily detachable from each other. The clamping elements are capable of gripping or clamping multiple transmission lines at one time, and comprise mating posts and receptors to facilitate their alignment with respect to one other upon placing them around transmission lines. Once the clamping elements are aligned with one another via the mating posts and receptors, they are pressure-engaged together to form a gripping or clamping structure. The gripping effect is such that the line hanger can be moved along the transmission line(s) until it is placed in the desired location and before it is firmly secured with an attachment means.

The line hanger of this invention also comprises a securing/stacking aperture that extends through it and parallel to the mating posts and receptors. The device of the present invention secures cables or lines two at a time and includes an attachment means (which is also referred to above as the "quick connect" feature). The attachment means or quick connect feature of this invention allows additional cables to be piggy-backed to the original securing hanger. The present invention, therefore, allows multiple "piggy-backing" to take place, as needed. In addition, the present invention can be manufactured to accommodate cables of different relative thicknesses and varying cross-sectional shapes, so it can be used to piggyback cables of variable sizes and of differing types.

The attachment means is placed through the securing/stacking aperture. The attachment means is capable of allowing firm securing of the transmission lines between the clamping elements. The attachment means comprises a first end and a second end. The first end of the attachment means is designed so it can be firmly engaged to the second end of another attachment means resulting in firm and secure stacking or piggy-backing of the line hangers in multiple directions and combinations. The combined surfaces of the clamping elements, which come in contact with the transmission lines and extend around the transmission lines' surface and conform to the shape of transmission lines, result in a firmly clamped structure.

DETAILED DESCRIPTION OF THE PREFERRED EMBODIMENT OF THE INVENTION

Figure 1:
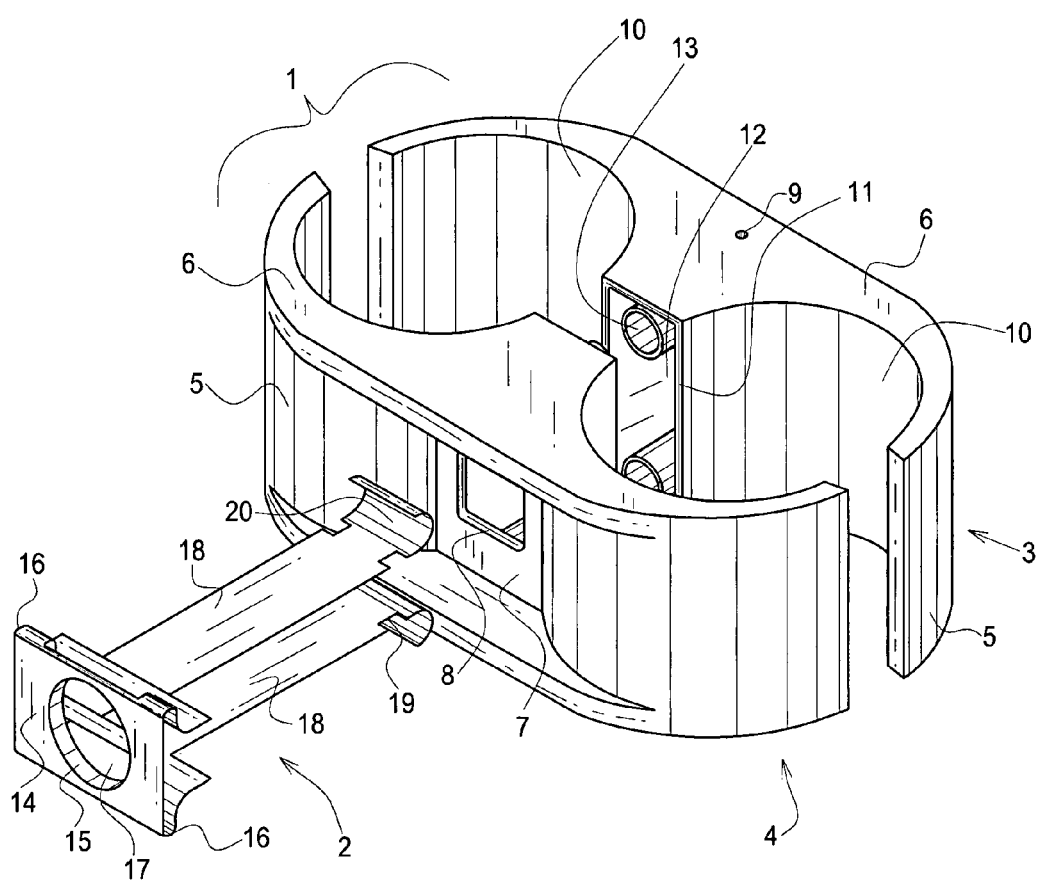
FIG. 1 is an exploded perspective view of the invention.
Figure 2:
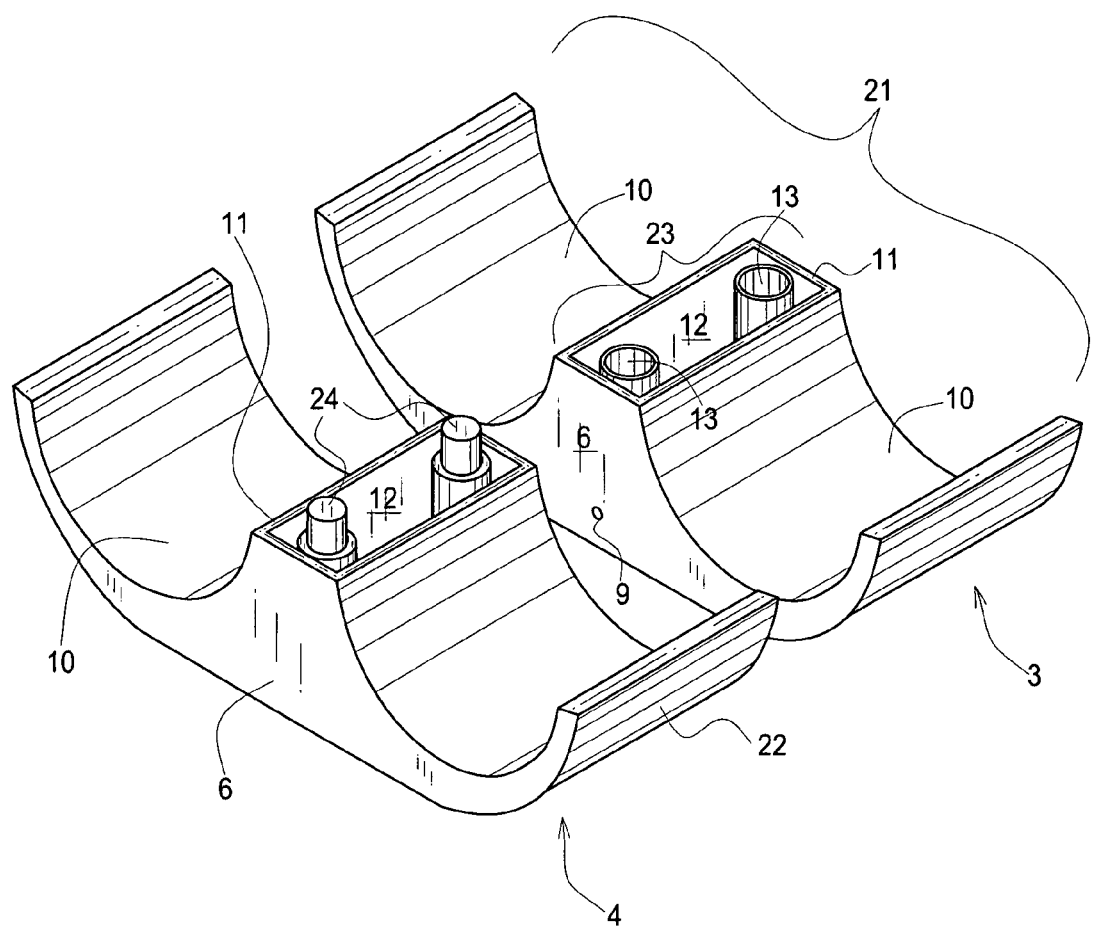
FIG. 2 is a perspective view of the two clamping elements of the invention.
Figure 3:
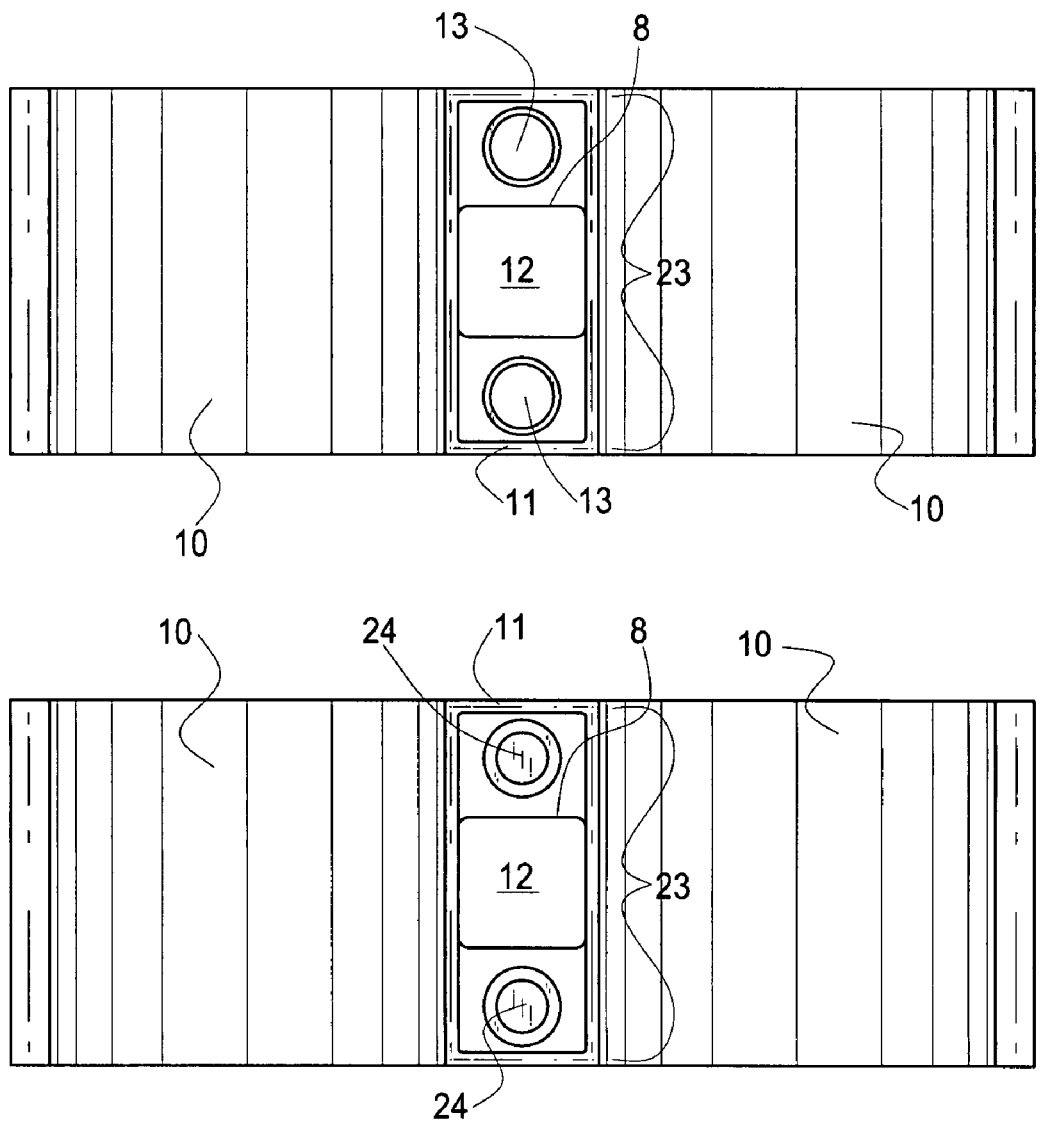
FIG. 3 is a top view of the two clamping elements of the invention.
Figure 4:
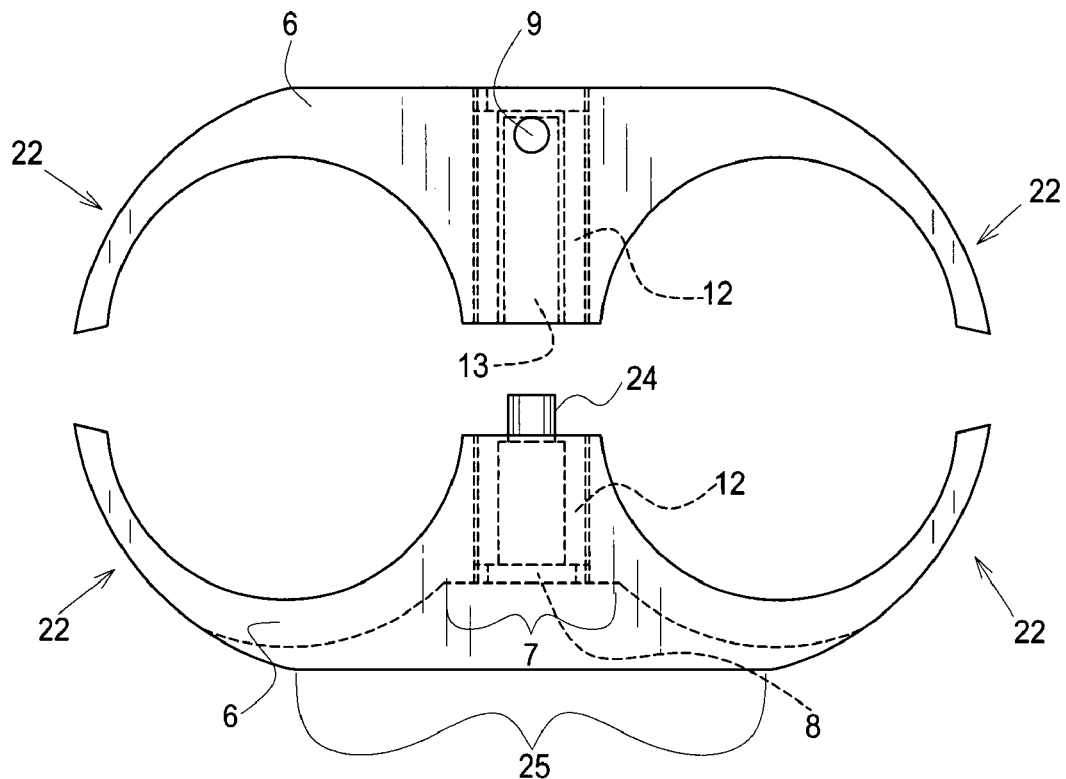
FIG. 4 is a side view of the two clamping elements of the invention.
Figures 5, 6:
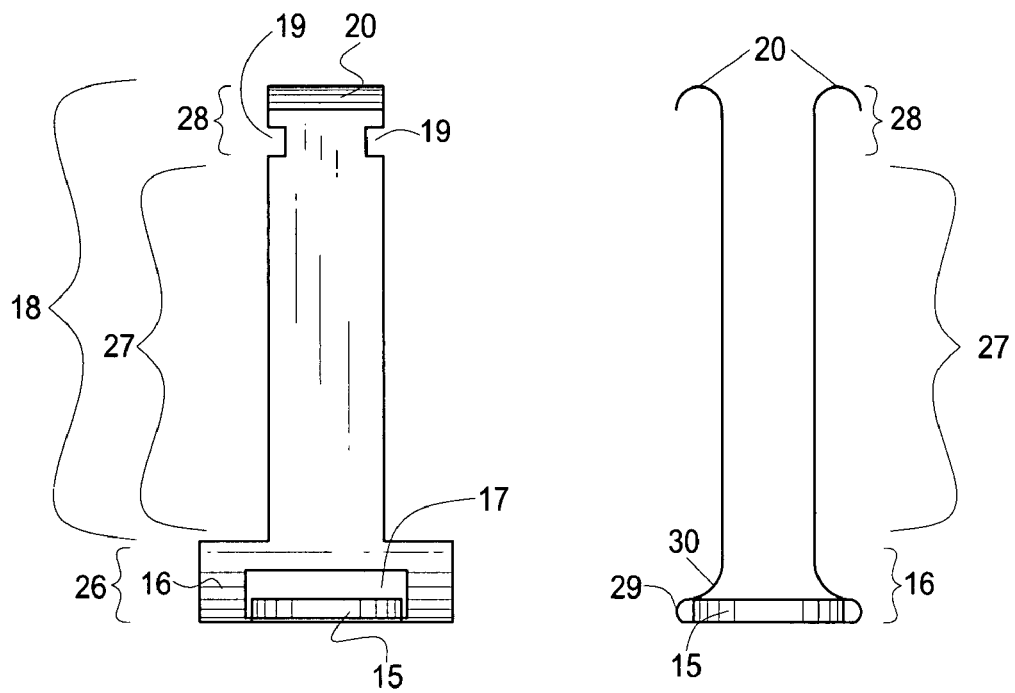
FIG. 5 is a front view of the attachment means of the invention.
FIG. 6 is a side view of the attachment means of the invention.
Figure 7:
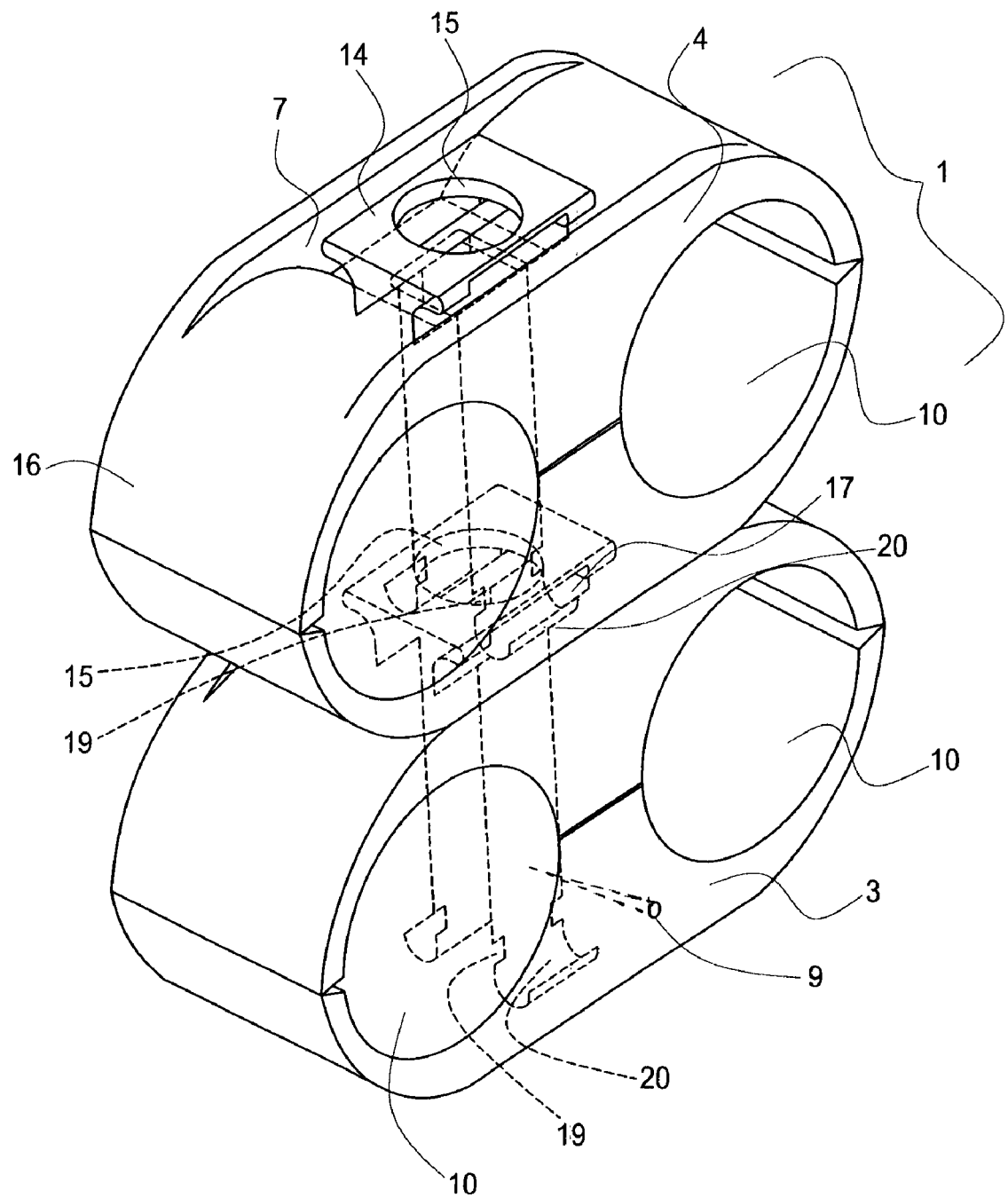
FIG. 7 is a perspective view of two stacked attachment means of the invention when two stackable transmission line hangers have been assembled.

In the preferred embodiment of the invention, the stackable transmission line hanger comprises a transmission line clasping section (1) and a unitary attachment means (2). The transmission line clasping section is manufactured using a UV-resistant plastic and functions to secure the transmission line. The attachment means (2) is made of a single piece of small gauge stainless steel and firmly holds the elements of stackable transmission line hanger together, and connects the transmission line hanger to a supporting structure or to another stackable transmission line hanger in a piggy-back fashion.

The transmission line clasping section (1) is an elliptical or rectangular block that clamps onto one or two parallel transmission lines and comprises two nearly identical pieces, the upper clamping element (4) and the lower clamping element (3). Each clamping element in turn comprises an outer end (5), an inner end (21) which engages the transmission lines, and two flat, identical sides (6). Both sides of the lower clamping element, but not the upper clamping element, comprise a pinhole (9), which intersects the securing aperture (12) and is capable of receiving a brad, nail or other skinny elongated object. The outer ends (5) comprise two curved ends (22) and a flat center (25). On the upper clamping element, the flat center comprises a recessed rectangular portion (7) with a square opening (8) that connects to a securing aperture (12). The securing aperture (12) is an open channel capable of allowing passage of an attaching means when the upper clamping element (4) and lower clamping element (3) are aligned. On the lower clamping element, the flat center (25) comprises a square opening that connects to a securing aperture (12).

The inner ends (21) of the clamping elements comprise an interlocking portion (23) and two grasping surfaces (10), one on either side of the interlocking portion. In the preferred embodiment of the invention, the grasping surfaces have a semi-circular cross-section to engage a round cable. In an alternative embodiment, the cross-sections of the grasping surfaces can be shaped so that it engages differently shaped cables, pipes or conduits. The grasping surfaces can also vary in diameter to accommodate different sizes of cables, pipes or conduits. In alternate embodiments, the two grasping surfaces of a single clamping element could be differently sized or shaped to accommodate two different types or diameters of cables. In another alternative embodiment, the gripping surfaces could have gripping means such as grooves or ridges to assist in securely gripping the transmission lines to reduce slippage.

The interlocking portions (23) of the gripping elements comprise a rectangular perimeter (11), its four sides being formed by the two grasping surfaces (10) intersecting the sides of the gripping elements (6). The upper interlocking portion further comprises two male conical posts (24) with an opening between them, the opening being part of the securing aperture (12) which runs parallel to the male conical posts. The male conical posts extend beyond the rectangular perimeter. The lower interlocking portion further comprises two female conical receptors (13) that correspond to the two male conical posts and are sized to engage the two posts. An opening between the female receptors forms part of the securing aperture (12). When the upper and lower gripping elements are aligned with their inner ends (21) facing each other, the posts and receptors align and can be pressed together to firmly engage one another and hold the transmission line clasping section (1) together. The posts and receptors can be disengaged from one another using minimal force, necessitating the use of the attachment means (2) to keep the transmission line clasping section together for installation of the line hanger.

In the preferred embodiment of the invention, the attachment means (2) is manufactured of 22 gauge stainless steel, although different gauges of stainless steel and other materials can be utilized in alternative embodiments. The attachment means (2) comprises three distinct sections: a stacking section (26), which enables the piggy-backing feature and two legs (18), which have some flexibility due to their length. The legs comprise two engaging elements which enable them to fixedly attach to adjacent stackable transmission line hangers or apertures in support structures.

The stacking section (26) comprises a flat, generally rectangular top section (14) which comprises a reinforced circular aperture (15) and two curved sides (16). The curved sides form a unidirectional, one hundred eighty (180) degree loop (29), further extending perpendicularly ninety (90) degrees (30). The curved sides comprise a rectangular gap (17) that begins in the one hundred eighty (180) degree loop (29) and extends to the point where the ninety (90) degree extension (30) begins. The legs (18) begin immediately past the ninety (90) degree extension, where the width of the attachment means necks down to a width slightly narrower than the width of the rectangular gap (17) and much narrower than the reinforced circular aperture (15).

The legs comprise an elongated region (27) and an attaching region (28). The elongated region's length gives the legs the flexibility to be pressed toward each other when pressure is applied and to expand away from each other when released. The elongated region is located between the stacking section (26) and the attaching region (28) and is at least as long as the length of the securing aperture (12). When the stackable transmission line hanger is fully assembled, the attaching region will extend from the square opening (8) of the upper clamping element (4), through the securing aperture (12) to the square opening of the lower clamping element. The attaching regions of the legs comprise the engaging elements: two opposing notches (19) adjacent to the elongated region (27) and a curved end (20) that forms a semi-circle, resulting in a J-shaped cross-section. The opposing notches are of an appropriate length and width to engage the reinforced circular aperture (15) of the rectangular top section (14) of another stackable transmission line hanger or an aperture in the support structure to which the transmission lines are being affixed. When the legs (18) are pressed together, the curved ends (20) of the attaching region are capable of being inserted through the square opening (8) of the transmission line clasping section (1) and the reinforced circular aperture (15) of another stackable transmission line hanger's attachment means (2). After being inserted through the reinforced circular aperture of another attachment means, the curved ends (20) are capable of inserting through the rectangular gaps (17) of the stacking section and securing the two attachment means, and therefore multiple transmission line hangers, together.

The stackable transmission line hangers are easy to assemble, stack, unstack and disassemble. Their method of use makes it fast and efficient to secure multiple transmission lines to a supporting structure. The method of assembling a stackable transmission line hanger comprises the steps of: (1) grasping one or two transmission lines to be secured; (2) positioning the upper and lower clamping elements on opposite sides of the transmission lines with the inner ends facing the transmission lines; (3) aligning the upper and lower clamping elements so that the posts in the upper clamping element align with the receptors in the lower clamping element; (4) pressing the two clamping elements together until the posts and receptors firmly engage one another; (5) grasping the attachment means; (6) aligning the attaching region of the legs with the square opening of the outer end of the upper clamping section while aligning the square opening of the lower clamping element with an aperture in a structure to which the transmission line hanger will be affixed; (7) pressing the two legs together; and (8) inserting them through the square opening of the upper clamping element, into the securing aperture, out the square opening of the lower clamping element and into the aperture in the supporting structure. The transmission line hangers can be stacked to each other by repeating all of the steps for assembling the transmission line hanger, but instead of aligning the square opening of the lower clamping element with an aperture in the supporting structure, the square opening must be aligned with the reinforced circular aperture of a previously installed line hanger's attachment means. The curved ends of the legs of the new stackable transmission line hanger insert through the reinforced circular aperture and into the rectangular gaps of the stacking section of the installed stackable transmission line hanger, and the notches in the legs of the new stackable transmission line hanger engage the reinforced circular aperture of the stacking section of the installed stackable transmission line hanger.

The method of disassembling stackable transmission line hangers comprises the steps of (1) inserting a brad into both pinholes of the lower clamping element until the brad presses the legs of the attachment means sufficiently together to dislodge the curved ends and notches of the legs from the structure or line hanger to which the transmission line hanger is affixed; (2) grasping the stacking section of the attachment means in one hand and the transmission line clasping section in the other; (3) extracting the attachment means from the transmission line clasping section; (4) pulling apart the two clamping elements with a small amount of force to disengage their interlocking portions; and (5) removing the lower clamping elements from around the transmission lines.

What is claimed is:

1. A stackable transmission line hanger for attaching multiple lines, coaxial cables, electrical cables, waveguides, pipes or lengths of similar products to a supporting structure, comprising:

a. a transmission line clasping section comprising an elliptical block, the elliptical block comprising an upper clamping element and a lower clamping element, the clamping elements comprising an outer end, an inner end and two identical flat sides, the outer ends comprising two curved ends and a flat center, the flat center of the upper clamping element comprising a recessed rectangular portion with a square opening that connects to a securing aperture through which an attaching means can pass, creating a securing aperture extending through the inner ends of the upper and lower clamping element when the upper clamping element and lower clamping element are aligned, the flat center of the lower clamping element comprising a square opening that connect to the securing aperture, the inner ends comprising two grasping surfaces with semi-circular cross-sections capable of engaging a transmission line and an interlocking portion between the two grasping surfaces; the interlocking portion of the upper clamping element comprising a rectangular perimeter which is formed by the two grasping surfaces intersecting the sides of the gripping elements, the rectangular perimeter surrounding two male conical posts that extend beyond the rectangular perimeter and a space for the securing aperture between the male conical posts; the interlocking portion of the lower clamping element comprising a rectangular perimeter surrounding two conical female receptors corresponding to the two male conical posts of the upper clamping element and a space for the securing aperture between the conical female receptors, the sides of the lower clamping element comprising a pinhole which intersects the securing aperture capable of receiving a brad; and b. a unitary attachment means, comprising a stacking section and two legs, the stacking section comprising a rectangular top section and two curved sides, the rectangular top section comprising a reinforced circular aperture, the curved sides comprising a unidirectional one hundred eighty degree loop, a ninety degree turn where the stacking section adjoins the legs, resulting in the legs being perpendicular to the rectangular top section of the stacking section, and rectangular gap extending through the curved sides and being longer and wider than the legs, the legs being flat and necked down from the width of the stacking section and narrower than the reinforced circular aperture and comprising an elongated region and an attaching region, the elongated region being between the stacking section and the attaching region and being of sufficient length to extend through the center opening of the cable retention section, the attaching region comprising two opposing notches adjacent to the elongated region and a curved end with a J-shaped cross-section, the curved ends being capable of sliding through and engaging the rectangular gap in the curved sides of the stacking section, the notches being of a length and width capable of engaging the reinforced circular aperture of the rectangular top section; the legs being capable of being pressed toward each other and expanding away from each other when released by spring force, the legs being of such dimensions that they can fit through both the reinforced circular aperture of the rectangular top section and the square opening in the outer ends of the clamping elements when pressed together; the features of the legs and the stacking section resulting in the capability of creating a joint between one attachment means and another and thereby stacking one transmission line hanger onto another.

2. A stackable transmission line hanger for attaching multiple lines, coaxial cables, electrical cables, waveguides, pipes or lengths of similar products to a supporting structure according to claim 1, wherein the attachment means is made of 22 gauge stainless steel.

3. A stackable transmission line hanger for attaching multiple lines, coaxial cables, electrical cables, waveguides, pipes or lengths of similar products to a supporting structure according to claim 1, wherein the transmission line retention section is made of UV-resistant plastic.

4. A stackable transmission line hanger for attaching multiple lines, coaxial cables, electrical cables, waveguides, pipes or lengths of similar products to a supporting structure according to claim 1, wherein the cross-sections of the grasping surfaces are of varying shapes to accommodate non-round cables.

5. A stackable transmission line hanger for attaching multiple lines, coaxial cables, electrical cables, waveguides, pipes or lengths of similar products to a supporting structure according to claim 1, wherein the cross-sections of the grasping surfaces are of varying diameters and shapes to accommodate cables of different diameters and shapes.

6. A stackable transmission line hanger for attaching multiple lines, coaxial cables, electrical cables, waveguides, pipes or lengths of similar products to a supporting structure according to claim 1, wherein the grasping surfaces comprise a plurality of grooves extending across the grasping surfaces to prevent slippage of an engaged transmission line.

7. A method of assembling the stackable transmission line hanger of claim 1 comprising the steps of:
- a. grasping one or more transmission lines to be secured and positioning the upper and lower clamping elements on opposite sides of the transmission lines with the inner ends facing the transmission lines;
- b. aligning the upper and lower clamping elements so that the posts in the upper clamping element align with the receptors in the lower clamping element and pressing the two clamping elements together until the posts and receptors firmly engage one another;
- c. grasping the attachment means and aligning the attaching region of the legs with the square opening of the outer end of the upper clamping section while aligning the square opening of the lower clamping element with an aperture in a structure to which the transmission line hanger will be affixed; and
- d. pressing the two legs together and inserting them through the square opening of the upper clamping element, into the securing aperture, out the square opening of the lower clamping element and into an aperture in a structure to which the transmission line hanger will be affixed.

8. A method of assembling a stackable transmission line hanger according to claim 7, wherein the structure to which the transmission line hanger will be affixed is a supporting structure for the transmission line.

9. A method of assembling a stackable transmission line hanger according to claim 7, wherein the structure to which the first transmission line hanger will be affixed is a second stackable transmission line hanger, and the curved ends of the legs of the first stackable transmission line hanger insert through the reinforced circular aperture and into the rectangular gaps of the stacking section of the second stackable transmission line hanger, and the notches in the legs of the first stackable transmission line hanger engage the reinforced circular aperture of the stacking section of the second stackable transmission line hanger.

10. A method of disassembling the stackable transmission line hanger of claim 1 comprising the steps of:
- a. inserting a brad into both pinholes of the lower clamping element until the brads press the legs of the attachment means sufficiently together to dislodge the curved ends and notches of the legs from the structure to which the transmission line hanger is affixed;
- b. grasping the stacking section of the attachment means in one hand and the transmission line clasping section in the other and extracting the attachment means from the transmission line clasping section;
- c. pulling the two clamping elements apart to disengage the interlocking portions; and
- d. removing the upper clamping element and the lower clamping element from around the transmission lines.

* * * * *

UNITED STATES PATENT AND TRADEMARK OFFICE
CERTIFICATE OF CORRECTION

PATENT NO. : 7,484,698 B2  
APPLICATION NO. : 11/789359  
DATED : February 3, 2009  
INVENTOR(S) : Michael Budagher It is certified that error appears in the above-identified patent and that said Letters Patent is hereby corrected as shown below:

On the Title Page  
The Attorney, Agent or Firm information is missing.

Please correct the Patent to include:  
Item (74) Attorney, Agent, or Firm—Alberto A. León, Esq., Bauman, Dow & León, P.C.

Signed and Sealed this

Twenty-first Day of December, 2010

David J. Kappos  
*Director of the United States Patent and Trademark Office*